Fig. 1.

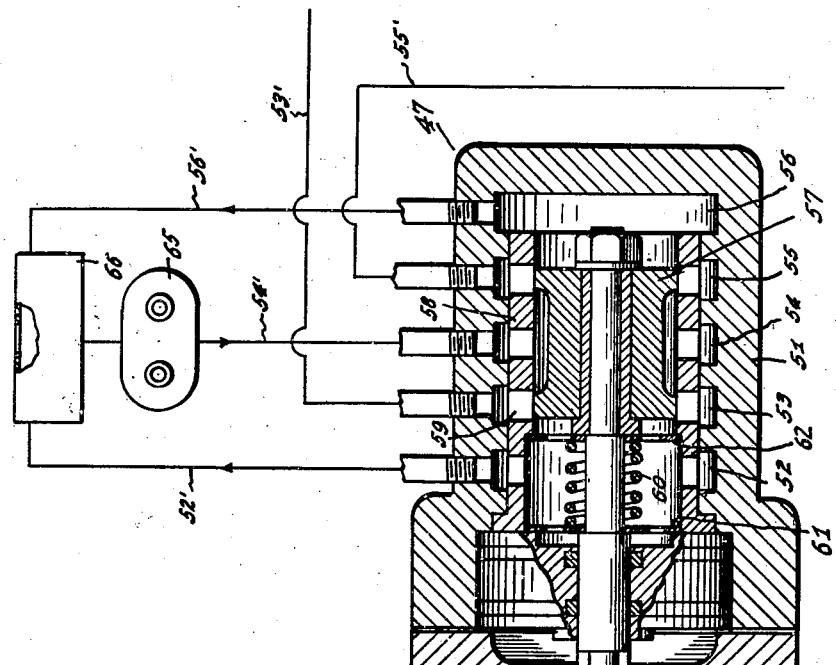
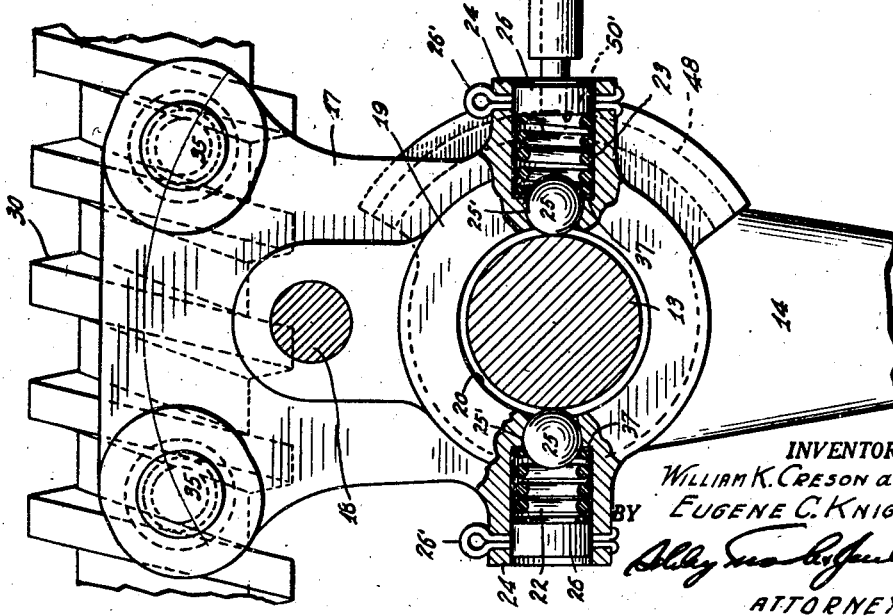

Dec. 30, 1947.  W. K. CRESON ET AL  2,433,651
POWER STEERING GEAR
Filed March 26, 1945  3 Sheets-Sheet 3

INVENTORS
*William K. Creson and*
*Eugene C. Knight,*
BY
ATTORNEYS.

Patented Dec. 30, 1947

2,433,651

UNITED STATES PATENT OFFICE 2,433,651

POWER STEERING GEAR

William K. Creson and Eugene C. Knight, La Fayette, Ind., assignors to Ross Gear & Tool Company, La Fayette, Ind., a corporation of Indiana Application March 26, 1945, Serial No. 584,966

19 Claims. (Cl. 180—79.2)

Our invention relates to steering gears for vehicles and more particularly to a steering gear in which a power-operated booster device is provided to assist the operator of the vehicle when steering effort exceeds a predetermined maximum. It is the primary object of our invention to produce a booster control which will be applicable to a wide variety of steering gears, which will permit a wide degree of flexibility in design which can be simply and economically manufactured, and which will be dependable in operation.

In carrying out our invention we employ a rock shaft adapted for connection in any desired fashion to the dirigible wheels of a vehicle. The booster device, which in the preferred embodiment of the invention is hydraulic in character, is operatively connected to the dirigible wheels conveniently through at least a portion of the means employed to connect the rock shaft to such wheels. Pivotally connected to the rock shaft on an eccentric axis we provide an actuating member which is in turn connected to the manually operated steering shaft desirably through means providing a substantial mechanical advantage. The actuating member has a limited freedom of movement about its pivotal connection to the rock shaft, and is spring-biased to an intermediate or neutral position within its range of movement. Control of the booster device is effected in response to movement of the actuating member relative to the rock shaft; and for this purpose the actuating member is provided with an arcuate groove substantially co-axial with the rock shaft when the actuating member is in its neutral position. Such groove receives a pin operatively connected to a valve which controls actuation of a hydraulic booster device.

Figure 1:
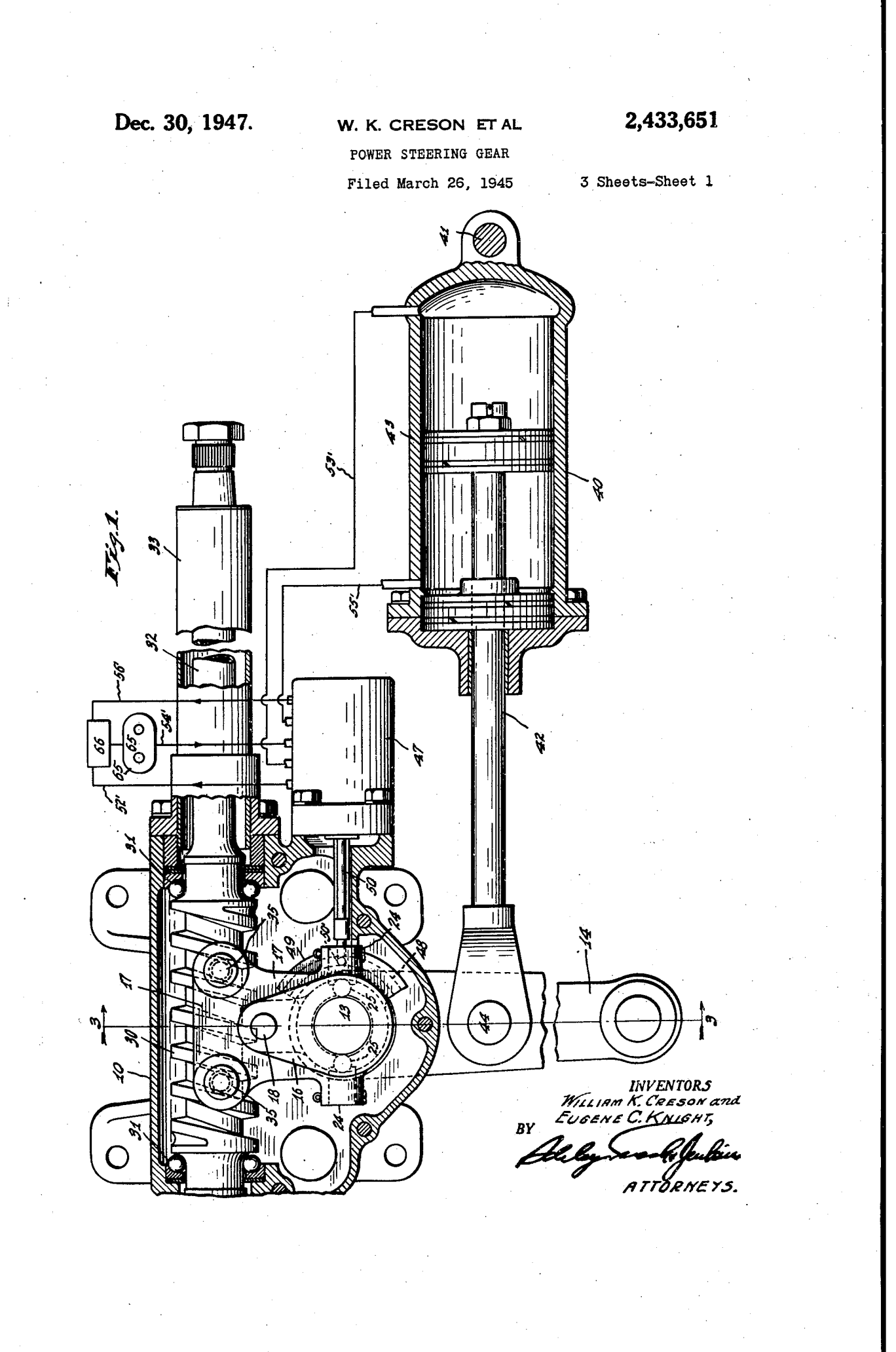
Figure 3:
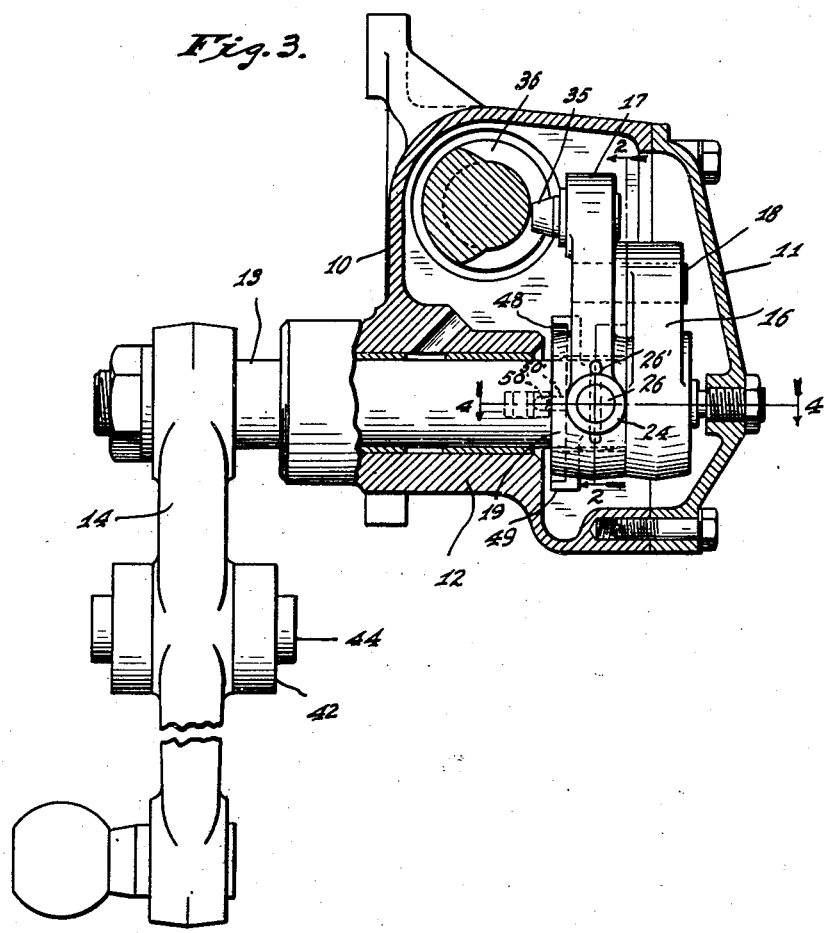
Figure 4:
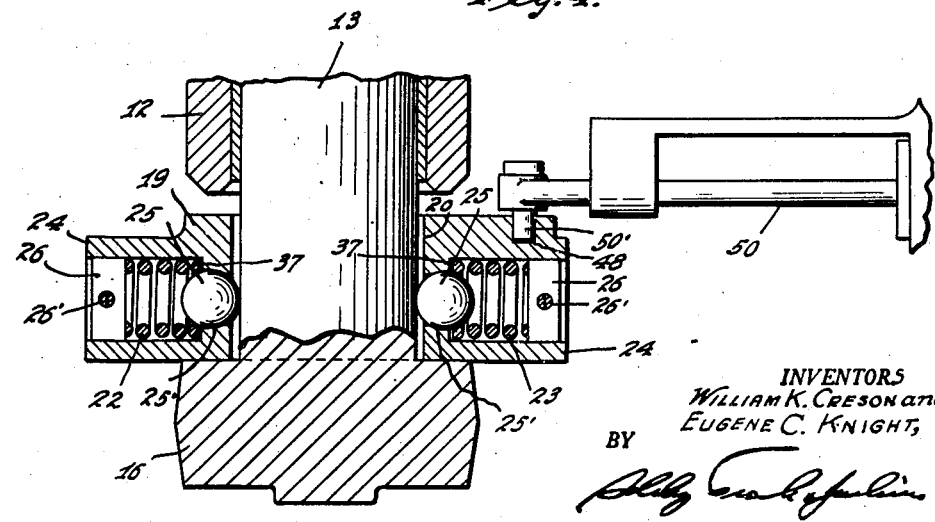

The accompanying drawings illustrate our invention. Fig. 1 is a side elevation of our steering gear with parts thereof broken away and shown in vertical section. Fig. 2 is a fragmental vertical section on an enlarged scale on the line 2—2 of Fig. 3; Fig. 3 is a transverse vertical section on the line 3—3 of Fig. 1; and Fig. 4 is a horizontal section on the line 4—4 of Fig. 3.

The steering gear shown in the drawing comprises a housing 10 provided with a removable cover 11. The housing 10 is formed to provide a bearing 12 which rotatably supports a rock shaft 13 projecting both into and out of the housing. To the outer end of the rock shaft 13 there is rigidly affixed steering arm 14 adapted for connection to the dirigible wheels of the vehicle with which the steering gear is associated.

Within the housing, the rock shaft 13 is provided with a laterally extending arm 16, desirably integral with the rock shaft. The arm 16 is spaced from the inner end of the bearing 12, and between it and the bearing there is disposed an actuating member 17 which is pivotally connected to the outer end of the arm 16, as by means of a pin 18, on an axis parallel to the axis of the rock shaft. The actuating member extends inwardly along the arm 16 and is provided at its inner end with a hub 19 through the bore 20 in which the rock shaft 13 extends. The bore 20 has a diameter somewhat greater than the diameter of the rock shaft 13, with the result that the actuating member has a limited freedom of pivotal movement about the axis of the pivot pin 18.

Acting between the hub 19 of the actuating member and the shaft 13 we provide yielding means tending to hold the actuating member in a neutral position intermediate the limits of its movement about the pin 18. As will be clear from Figs. 2 and 4, such yielding means desirably takes the form of a pair of compression springs 22 and 23 mounted in bosses 24 on diametrically opposite sides of the hub 19 and acting on the rock shaft 13 through thrust members 25, desirably in the form of steel balls, located in guideways 25' in the hub 19 of the actuating member. Each of the bosses 24 is provided with a plug 26 against which the outer end of the associated compression spring acts. Cotter pins 26' may be employed to hold the plugs 26 in position.

The actuating member 17 extends outwardly of the arm 16 beyond the pivot pin 18 and is there adapted for connection to a means which can be operated by the steering shaft to tend to cause the actuating member to swing in either direction on the pin 18. In the particular device illustrated in the drawing, this means takes the form of a helical cam 30 rotatably mounted in the housing 10, desirably through the medium of anti-friction bearings 31, and operatively connected to the steering shaft 32, which extends from the housing through a steering column 33. The outer end of the actuating member 17 is enlarged and provided with two spaced bosses 35 received in the groove of the cam 30. This particular means for moving the actuating member 17, which is more fully illustrated and described in United States Letters Patent No. 2,071,235, issued February 16, 1937, on the application of P. A. Newman, is shown here merely for purposes of illustration; as it is to be understood that other means may be employed if desired.

It will be obvious that in the device as so far described rotation of the cam 30 through the medium of the shaft 32 will tend to swing the actuating member on the pin 18. This tendency will be opposed by one or the other of the springs 22 and 23, with the result that a reaction is imposed on the pin 18 tending to rotate the arm 16, rock shaft 13, and steering arm 14. We prefer to so arrange the springs 22 and 23 and their associated thrust members 25 so that an effort of predetermined minimum magnitude is required to displace the actuating member 17 from its neutral position. To this end each of the springs is preloaded and the distance to which its associated thrust member may move inwardly under the influence of the springs is limited, either by restricting the guideway 25' or by providing a shoulder 37 adapted to engage the inner end of the spring and limit its inward movement. In such an arrangement, while the forces exerted by the two springs oppose each other when the actuating member is in neutral position, any substantial movement of the actuating member immediately relieves it of the force previously exerted by the spring which would further such movement while leaving it subject to the action of the opposing spring.

As a result of the characteristics just set forth, the actuating member 17, the rock shaft 13, and the steering arm 14 swing as a unit to operate the dirigible wheels under control of the steering shaft 32 so long as the steering effort is not great enough to overcome the preloading of the springs 22 and 23. When the steering effort does become great enough to overcome such preloading, however, the actuating member 17 swings about the axis of the pin 18, and this movement is availed of to control operation of the power-operated booster now to be described.

The power-operated booster in the device shown in the drawing is a hydraulic motor comprising a cylinder 40 adapted at one end for pivotal mounting on the vehicle frame, as through the medium of a pivot pin 41. Slidably mounted in the opposite end of the cylinder is a piston rod 42 which, within the cylinder, carries a piston 43. The outer end of the piston rod 42 is connected to the arm 14 through a pivot pin 44.

Operation of the hydraulic booster is controlled by a valve, designated in its entirety by the reference numeral 47, which is responsive to swinging movement of the actuating member 17 about the pivot pin 18. To this end, the actuating member 17 is provided with a valve-operating cam concentric with the rock shaft 13 when the actuating member is in its neutral position with respect to the rock shaft. In the arrangement shown, the cam is of the box type, comprising an arcuate groove 48 in a flange 49 integral with the actuating member. The groove 48, which is of uniform width throughout its extent, receives a cam follower in the form of a pin 50' projecting laterally from the stem 50 of the valve 47.

The valve 47 comprises a hollow casing 51 adapted to be bolted to the steering-gear housing 10. The casing 51 is provided interiorly with five axially spaced ports 52, 53, 54, 55, and 56 controlled by a spool-type valve member 57 rigidly mounted on the valve stem 50. Desirably, the casing 51 is provided interiorly with a liner 58 having an annular series of openings 59 coplanar with each of the ports. Means including a compression spring 60 and washers 61 and 62 cooperating with shoulders on the valve casing and valve stem serve to hold the valve stem in a neutral position in which the flanges of the valve member 57 are respectively coplanar with the ports 53 and 55. The axial thickness of each of the flanges of the valve member 57 is somewhat less than the diameter of the holes 59 in the liner 58, with the result that the valve flanges never completely occlude any of the ports.

The center port 54 is connected by a conduit 54' with the outlet of a fluid pump 65, the inlet of which is connected to a tank 66 containing a reserve supply of fluid. The two end ports 52 and 56 are connected by conduits 52' and 56' with the storage tank 66. The remaining valve ports 53 and 55, are connected respectively by conduits 53' and 55' with the right-hand end and the left-hand end of the cylinder 40. The pump 65 may be driven in any convenient manner, conveniently from the engine of the vehicle in which the steering gear is used.

In the drawings, the actuating member 17 is shown in its neutral position relative to the rock shaft 13, so that it can swing in either direction about the pivot pin 18. With the actuating member in that normal position, the valve stem and valve 57 are in their normal positions with the flanges of the valve member 57 respectively coplanar with the ports 53 and 55. In this condition, the fluid discharged from the pump 65 enters the valve casing through the port 54 and divides, part flowing to the left over the valve flange coplanar with the port 53 to the port 52 and thence through conduit 52' to the tank 66 and the remainder flowing to the right past the other valve flange, through the port 56 and conduit 56' to the tank 66.

To make the operation clear, assume that the steering shaft 32 is being rotated in a direction such as to swing the arm 14 in a clockwise direction (Figs. 1 and 2), and that the reaction of the dirigible wheels transmitted to the arm 14 is opposing such movement. In the assumed condition, the torque applied to the actuating member 17 by the cam 30 will tend to swing the actuating member in a clockwise direction about the axis of the pin 18, and such swinging movement will be opposed by the spring 23. As previously pointed out, the spring 23 is preloaded; and as long as the force it transmits does not exceed its preloading, the actuating member will remain in its normal position, the groove 48 will remain concentric with the rock shaft, and no movement of the valve stem 50 will take place. However, if the force transmitted by the spring 23 exceeds its preloading, the actuating member 17 will be permitted to swing about the axis of the pivot pin 18, thus moving the inner end of the actuating member to the left and causing the valve stem 50 also to move to the left. In the resulting movement of the valve member 57, the left-hand flange of the valve member 57 interrupts any flow between the valve ports 53 and 52 while the right-hand flange of the valve interrupts any flow between the ports 54 and 55. As a result, all fluid supplied to the port 54 from the pump 55 is now compelled to flow under pressure through the port 53 and conduit 53' to the right-hand end of the cylinder 40, while the left-hand end of the cylinder is placed in unrestricted communication with the open tank 66, through the conduit 55', ports 55 and 56, and conduit 56'. The resultant unbalance of fluid pressure on the piston 43 urges it to the left and causes the piston rod 42 to apply to the steering arm 14 a force which aids the operator in effecting its desired clockwise movement.

If the steering shaft 32 is rotated at a rate sufficient to maintain the spring 23 compressed, the valve 57 and valve stem 50 will remain displaced to the left, and the fluid will continue to flow from the pump into the right-hand end of the cylinder 40. However, when rotation of the steering shaft is stopped leftward movement of the piston rod 42 and the accompanying clockwise rotation of the steering shaft 13 and arm 16 under the influence of the still unbalanced pressure on the piston 43 will cause the hub of the actuating member to move to the right. As a result, the valve member 57 will be moved toward the right or toward its neutral position. When it reaches that position, pressures on opposite faces of the piston 43 will be balanced, thus stopping the movement of the piston rod 42 and the steering arm 14.

If the steering shaft 32 is rotated in the opposite direction, the actuating member 17 will tend to rotate in a counter-clockwise direction on the pin 18. This tendency will be resisted by the spring 22, which will act to maintain the actuating member in its normal position relative to the shaft 13 until the steering effort becomes great enough to overcome the preloading of the spring 22 and cause the inner end of the actuating member to move to the right. The resultant displacement of the valve member 57 will unbalance fluid pressures on the piston 43 and cause it to be urged to the right to assist the operator. When steering effort drops to a point sufficient to permit the spring 22 to restore the actuating member to its normal position relative to the shaft 13, the valve 57 will be restored to its neutral position and fluid pressures on the piston 43 will again become balanced.

It may be noted that if the effort tending to swing the steering arm 14 originates from road reaction on the dirigible wheels rather than from rotation of the steering shaft the hydraulic motor will act to assist the operator whenever the effort which the operator must exert to overcome such road reaction becomes great enough to overcome the preloading of the springs 22 and 23. Thus, if road reaction tends to swing the arm 14 in a clockwise direction and the operator applies an opposing torque to the shaft 32, the actuating member will tend to swing about the pin 18 to compress the spring 22. If the effort is great enough to compress the spring 22, the valve 57 will move to the right to unbalance fluid pressures on the piston and so create opposition to clockwise swinging of the arm 14

So long as the steering effort is not great enough to overcome the preloading of one or the other of the springs 22 and 23, those springs will act to maintain the actuating member in its normal position relative to the shaft 13. With the actuating member in that normal position the cam-groove 48 is concentric with the shaft with the result that such shaft and the arms 14 and 16 rigid with it can be swung in either direction under control of the steering shaft 32 without displacing the valve 57 from neutral position and causing an unbalance of fluid pressures on the piston. Under such conditions, the operation of the steering gear is substantially unaffected by the presence of the hydraulic motor.

We claim as our invention:

1. In a power-operated steering gear, a rock shaft adapted for connection to dirigible vehicle-wheels, an arm rigid with said rock shaft, an actuating member pivoted to said arm on an axis parallel but eccentric to the rock-shaft axis, means limiting swinging movement of said actuating member about its axis of mounting on said arm, yielding means opposing such swinging movement of said actuating member in either direction from a normal position intermediate the limits of its movement, said actuating member being provided with an arcuate groove substantially concentric with said rock shaft when the actuating member is in said normal position, a hydraulic motor operatively connected to said rock shaft, valve means for controlling said motor and including a part received in said groove, and mechanism including a steering shaft for applying to said actuating member a torque tending to swing it about its axis of pivotal mounting on said arm, the parts being so arranged and constructed that movement of said actuating member from said normal position will operate said valve means to cause said hydraulic motor to move said rock shaft in a direction to restore said actuating member to its said normal position.

2. In a power-operated steering gear, a casing, a rock-shaft extending through a wall of said casing and provided exteriorly thereof with a steering arm rigid with the rock-shaft and adapted for connection to dirigible vehicle-wheels, a second arm rigidly mounted on said rock-shaft within said casing, an actuating member pivotally supported from said second arm on an axis parallel but eccentric to the rock-shaft axis, means including a steering shaft for applying to said actuating member a torque tending to swing it about its axis of pivotal support, yielding means opposing swinging movement of said actuating member in either direction from a normal position relative to said rock-shaft, a power-operated device connected to said steering arm independently of said rock-shaft and actuating member for moving said rock-shaft about its axis, and control means for said power-operated device, said control means being responsive to movement of said actuating member from its normal position relative to said rock-shaft and including a cam on the actuating member substantially concentric with the rock shaft when the actuating member is in its normal position relative thereto, the parts being so arranged that movement of said actuating member from said normal position will operate said control means to cause said power-operated device to move said rock shaft in a direction to restore the actuating member to said normal position.

3. In a power-operated steering gear, a casing, a rock-shaft extending through a wall of said casing and provided exteriorly thereof with a steering arm rigid with the rock-shaft and adapted for connection to dirigible vehicle-wheels, a second arm rigidly mounted on said rock-shaft within said casing, an actuating member pivotally supported from said second arm on an axis eccentric to the rock-shaft axis, means including a steering shaft for applying to said actuating member a torque tending to swing it about its axis of pivotal support, yielding means opposing swinging movement of said actuating member in either direction from a normal position relative to said rock-shaft, a power-operated device connected to said steering arm independently of said rock-shaft and actuating member for moving said rock-shaft about its axis, and control means for said power-operated device, said control means being responsive to movement of said actuating member from its normal position relative to said rock-shaft, and including a cam on the actuating member substantially concentric with the rock shaft when the actuating member is in its normal position relative thereto, the parts being so arranged that movement of said actuating member from said normal position will operate said control means to cause said power-operated device to move said rock shaft in a direction to restore the actuating member to said normal position.

4. In a power-operated steering gear, a casing, a rock-shaft extending through a wall of said casing and provided exteriorly thereof with a steering arm rigid with the rock-shaft and adapted for connection to dirigible vehicle-wheels, a second arm rigidly mounted on said rock-shaft within said casing, an actuating member pivotally supported from said second arm on an axis parallel but eccentric to the rock-shaft axis, means including a steering shaft for applying to said actuating member a torque tending to swing it about its axis of pivotal support, yielding means opposing swinging movement of said actuating member in either direction from a normal position relative to said rock-shaft, a power-operated device connected to said steering arm independently of said rock-shaft and actuating member for moving said rock-shaft about its axis, and control means for said power-operated device, said control means being responsive to movement of said actuating member from its normal position relative to said rock-shaft, the parts being so arranged that movement of said actuating member from said normal position will operate said control means to cause said power-operated device to move said rock shaft in a direction to restore the actuating member to said normal position.

5. In a power-operated steering gear, a casing, a rock-shaft extending through a wall of said casing and provided exteriorly thereof with a steering arm rigid with the rock-shaft and adapted for connection to dirigible vehicle-wheels, a second arm rigidly mounted on said rock-shaft within said casing, an actuating member pivotally supported from said second arm on an axis eccentric to the rock-shaft axis, means including a steering shaft for applying to said actuating member a torque tending to swing it about its axis of pivotal support, yielding means opposing swinging movement of said actuating member in either direction from a normal position relative to said rock-shaft, a power-operated device connected to said steering arm independently of said rock-shaft and actuating member for moving said rock-shaft about its axis, and control means for said power-operated device, said control means being responsive to movement of said actuating member from its normal position relative to said rock-shaft, the parts being so arranged that movement of said actuating member from said normal position will operate said control means to cause said power-operated device to move said rock shaft in a direction to restore the actuating member to said normal position.

6. The invention set forth in claim 3 with the addition that said cam is in the form of an axially opening arcuate groove provided in said actuating member, said control means including a cam follower received in said groove.

7. The invention set forth in claim 3 with the addition that said power-operated device is a hydraulic motor, said control means comprising a valve operated by said cam.

8. The invention set forth in claim 2 with the addition that said yielding means is preloaded whereby the torque tending to swing said actuating member relative to said rock shaft must exceed a predetermined minimum value before said actuating member will be displaced from its normal position.

9. The invention set forth in claim 5 with the addition that said yielding means is preloaded whereby the torque tending to swing said actuating member relative to said rock shaft must exceed a predetermined minimum value before said actuating member will be displaced from its normal position.

10. The invention set forth in claim 4 with the addition that said actuating member has a hub portion provided with a bore in which said rock-shaft is received, said bore being larger than said rock shaft to permit limited swinging movement of said actuating member about its axis, said yielding means comprising thrust members bearing on opposite sides of said rock shaft, a compression spring acting between each of said thrust members and said hub to urge the thrust member inwardly toward the rock-shaft, and means limiting inward movement of each thrust member under the influence of its associated spring.

11. The invention set forth in claim 4 with the addition that said yielding means comprises thrust members movably mounted on said actuating member and engaging opposite sides of said shaft, springs carried by said actuating member and urging the respective thrust members inwardly against the shaft, and means limiting inward movement of each thrust member under the influence of its associated spring.

12. The invention set forth in claim 4 with the addition that said yielding means comprises thrust members movably mounted on said actuating member and engaging opposite sides of said shaft, and springs carried by said actuating member and urging the respective thrust members inwardly against the shaft.

13. The invention set forth in claim 2 with the addition that said first named means comprises a rotatable cam provided with a helical groove and rotatable by said steering shaft, said actuating member being provided with a cam follower received in said helical groove.

14. The invention set forth in claim 5 with the addition that said first named means comprises a rotatable cam provided with a helical groove and rotatable by said steering shaft, said actuating member being provided with a cam follower received in said helical groove.

15. The invention set forth in claim 2 with the addition that said first named means is a speed-reducing means, said yielding means being preloaded whereby the torque tending to swing said actuating member relative to said rock shaft must exceed a predetermined minimum value before said actuating member will be displaced from its normal position.

16. The invention set forth in claim 5 with the addition that said first named means is a speed-reducing means, said yielding means being preloaded whereby the torque tending to swing said actuating member relative to said rock shaft must exceed a predetermined minimum value before said actuating member will be displaced from its normal position.

17. In a power-operated steering gear, a rock-shaft provided with a steering arm adapted for connection to dirigible vehicle-wheels, an actuating member supported from said rock shaft, said actuating member being provided with a circular cam which is concentric with the rock shaft when the actuating member is in normal position relative to the rock shaft, operating means including a steering shaft for moving said actuating member in either direction from said normal position to cause said cam to become eccentric to the rock-shaft axis, a power-operated device operatively connected to said steering arm, and control means for said power-operated device including a rectilinearly movable cam follower co-operating with said cam, the parts being so arranged that movement of said actuating member from said normal position will operate said control means to cause said power-operated device to move said rock shaft in a direction to restore the actuating member to said normal position.

18. The invention set forth in claim 17 with the addition of a housing in which said rock shaft is rotatably supported and said actuating member enclosed, said cam follower being movably supported from said housing.

19. In a power-operated steering gear, a rock-shaft adapted for connecting to dirigible vehicle-wheels, a housing in which said rock-shaft is rotatably supported, an actuating member within said housing and supported from said rock-shaft, operating means including a steering shaft for moving said actuating member in either direction from a normal position relative to said shaft, a power-operated device operatively connected to said rock-shaft, and a control means for said power-operated device responsive to variations in the distance between the rock-shaft axis and a point on said actuating member, said control means including a member movably supported from said housing and operatively connected to said actuating member, the parts being so arranged that movement of said actuating member from said normal position will operate said control means to cause said power-operated device to move said rock-shaft in a direction to restore the actuating member to said normal position.

WILLIAM K. CRESON.
EUGENE C. KNIGHT.

REFERENCES CITED

The following references are of record in the file of this patent:

UNITED STATES PATENTS

| Number | Name | Date |
|---|---|---|
| 2,018,197 | Vorech et al. | Oct. 22, 1935 |
| 2,051,816 | Bragg | Aug. 25, 1936 |
| 1,874,248 | Davis | Aug. 30, 1932 |